United States Patent [19]

Woods et al.

[11] Patent Number: 5,102,033

[45] Date of Patent: Apr. 7, 1992

[54] METHOD FOR IMPROVING THE FILLET-FORMING CAPABILITY OF ALUMINUM VACUUM BRAZING SHEET PRODUCTS

[75] Inventors: Ralph A. Woods, Pleasanton; Arthur C. Scott, Livermore; Dennis D. Przybycien, Pleasanton, all of Calif.

[73] Assignee: Kaiser Aluminum & Chemical Corporation, Oakland, Calif.

[21] Appl. No.: 685,754

[22] Filed: Apr. 16, 1991

[51] Int. Cl.$^5$ ............... B23K 35/363; B23K 101/14; B23K 103/10

[52] U.S. Cl. ................ 228/263.17; 228/206; 228/183; 29/890.054; 156/665

[58] Field of Search ............. 228/206, 263.17, 183; 29/DIG. 2, DIG. 4, DIG. 16, 890.054; 156/665

[56] References Cited

U.S. PATENT DOCUMENTS

| | | | |
|---|---|---|---|
| 2,287,111 | 6/1942 | Loud | 134/3 |
| 2,711,364 | 6/1955 | Beach | 252/79.3 |
| 2,957,239 | 10/1960 | Prichard | 228/206 |
| 3,008,104 | 11/1961 | Scapple et al. | 228/206 |
| 3,440,712 | 4/1969 | Stroup | 228/263.17 |
| 3,458,353 | 7/1969 | Baldi | 134/41 |
| 3,497,945 | 3/1970 | Green | 228/206 |
| 3,597,832 | 8/1971 | Calton | 228/113 |
| 3,622,391 | 11/1971 | Baldi | 252/142 |
| 3,779,839 | 12/1973 | Kaihu et al. | 156/665 |
| 4,586,964 | 5/1986 | Finnegan et al. | 228/263.17 |
| 4,851,091 | 7/1989 | Uesugi et al. | 156/665 |

FOREIGN PATENT DOCUMENTS

3104107A1 8/1982 Fed. Rep. of Germany ...... 228/206

OTHER PUBLICATIONS

Metals Handbook, 9th ed., vol. 6, "Welding Brazing and Soldering", 1983, pp. 1025, 1029.

Primary Examiner—Richard K. Seidel
Assistant Examiner—Jeanne M. Elpel
Attorney, Agent, or Firm—Andrew E. Barlay

[57] ABSTRACT

The fillet-forming ability of brazeable aluminum alloy materials, such as brazing sheet or heat exchanger components, for example fins, tubes and headers, is significantly improved by treating the material, prior to brazing, with an aqueous acid solution containing a dilute mixture of HF and $HNO_3$. The treatment generally takes place for a period of not less than 5 seconds within the temperature range from about 15 to about 98° C.

10 Claims, No Drawings

METHOD FOR IMPROVING THE FILLET-FORMING CAPABILITY OF ALUMINUM VACUUM BRAZING SHEET PRODUCTS

BACKGROUND OF THE INVENTION

This invention relates to the treatment of the surface of aluminum vacuum brazing sheet for improving its fillet-forming capability during vacuum brazing. The surface treatment involves light etching of the sheet surface with a mixture of aqueous HF and $HNO_3$.

Aluminum is widely employed in the automotive industry as a material of construction and one area of use involves its application in the manufacture of automotive heat exchangers, such as radiators. In the manufacture of radiators it is necessary to join different parts together and most frequently such joining is accomplished through brazing. Brazing generally provides good bonding between the parts to be joined provided the surfaces to be joined are clean. In the case of aluminum parts to be joined by brazing it is necessary to disrupt or remove the tenacious oxide surface layer from the aluminum parts in order to achieve good bonding. In the past oxide surface layers were generally removed during flux or non-vacuum brazing by the application of different fluxes together with the brazing alloy. The most commonly used fluxes for such purpose were composed of mixtures of metal chlorides and fluorides, such as mixtures of NaCl-KCl-LiCl with $ZnCl_2$, $KF-AlF_3$ or other inorganic fluorides. When the chloride-containing flux mixtures are applied to the aluminum surfaces to be brazed it becomes necessary to remove residual, post-braze flux by thorough washing of the treated surfaces. This is to assure the removal of all residual flux from the surface which otherwise could cause corrosion of the brazed assembly.

To eliminate the need of washing off the flux remaining on the treated aluminum surface, the use of potassium tetrafluoroaluminate ($KAlF_4$), a complex fluoridic salt, was recommended. This salt can be obtained by the mixing of equimolar quantities of potassium fluoride (KF) and aluminum fluoride ($AlF_3$). This complex salt is often applied as slurry to the surfaces of the parts to be joined by brazing then it is dried and heated until it melts. This molten salt is capable of removing any aluminum oxide film coating the surfaces to be joined by brazing; but any salt remaining on the surface after brazing will no attack the aluminum metal due to its insolubility in water. Although this type of fluxing material has many advantages over the chloride salt mixtures, it is difficult to apply evenly to the surfaces to be joined, particularly, when the surfaces to be joined belong to complex heat exchangers.

The following U.S. patents represent references which relate to the use of various solid fluoride-containing fluxes which generate water-insoluble residues on the surface of the brazed joints: U.S. Pat. Nos. 3,951,328, 4,224,086, 4,556,165 and 4,579,605.

To avoid the difficulties associated with the use of the water-insoluble fluxes U.S. Pat. No. 4,619,716 recommends the use of an aqueous solution containing $KHF_2$. This solution, when in contact with aluminum, provides a chemical conversion coating of $K_2AlF_5$ on the surfaces to be joined by brazing. The aqueous solution used for the preparation of the $KHF_2$ can also be made from a mixture of KF and HF. Although the surface preparation method disclosed in this U.S. patent provides an improved coating method in comparison to the use of $KALF_4$ alone, the method described still requires careful preparation of the flux and a residual flux coating still remains on the surface of the brazed joints.

It has also been recommended in U.S. Pat. No. 3,779,839 to etch the surfaces to be vacuum brazed with a solution containing: (a) a fluoride compound; (b) a chlorine-containing salt; and (c) $CrO_3^-$ ion, in order to improve the fillet-forming ability. Although there is scant solid residue left behind after the etching treatment, the presence of $CrO_3$ ions and the chloridic compound may create corrosion problems subsequent to brazing unless the surfaces are thoroughly washed after etching. The use and disposal of this etchant may also create environmental problems due to the $CrO_3$ ion content.

It has now been discovered that etching of the aluminum surfaces to be joined by vacuum brazing with a highly dilute aqueous solution of HF and $HNO_3$ eliminates the need for a water-soluble or insoluble flux or etching with a fluoride-chloride solution in the presence of $CrO_3$. The produced brazed joints not only exhibit improved strength due to the increased fillet-forming ability but also improved appearance due to the absence of solid flux or harsh etching agents.

BRIEF SUMMARY OF THE INVENTION

Improved brazed joints are obtained on vacuum brazed aluminum sheet or heat exchanger surfaces, such as radiator assemblies, by treating the surfaces to be brazed with a dilute, aqueous acid solution containing a mixture of HF and $HNO_3$. Preferably, the aqueous acid mixture is applied warm and for a time period at least 5 seconds. The treated surfaces allow the formation strong brazed joints due to the increased fillet-forming ability of the etched surfaces. The dilute, aqueous HF-$HNO_3$ solution contains less than about 5% by weight HF and not more than about 20% by weight $HNO_3$. The acid-treated surfaces may be subjected to vacuum brazing without being washed with water although for best results rinsing with water and drying is preferred. The treatment with the dilute acidic solution can be applied to conventional aluminum alloy brazing sheet including clad aluminum brazing sheet and also to heat exchanger surfaces, for example radiator assemblies to be brazed.

DETAILED DESCRIPTION OF THE INVENTION

This invention relates to a method for improving the fillet-forming ability of aluminum vacuum brazing sheet as well as that of simple and/or complex heat exchanger surfaces, such as radiator assemblies. For purposes of convenience and simplicity, the use of the terms "vacuum brazing sheet" or "brazing sheet", hereinafter will refer not only to aluminum vacuum brazing sheet but also to other aluminum surfaces as well which are generally used for making heat exchangers, for example fins, tubes, headers and radiator assemblies. More particularly, this invention relates to the etching of the surface of aluminum vacuum brazing sheet with a dilute, aqueous acid solution containing a mixture of HF and $HNO_3$ acids. For the purposes of this invention the expression "aluminum" as used herein shall mean aluminum alloys of the 1000, 3000, 4000, 5000 and 6000 series as defined by the Aluminum Association. The brazing material which can be successfully treated by the instant method also includes aluminum alloy sheet clad with a layer of aluminum wherein the cladding is made of 4000 series alloys as defined by the Aluminum Association while the core material can be selected from other aforementioned aluminum alloys.

The aqueous surface treating or etching solution of the present invention, as mentioned before, contains HF and $HNO_3$. The quantity of HF in the aqueous treating solution is generally kept within the range from about 0.05 to about 5% by weight, preferably within the range from about 0.10 to about 0.65% by weight. The $HNO_3$ component of the aqueous etchant is within the range from about 1 to about 20% by weight, preferably within the range from about 2 to about 6% by weight. Although etching solutions which may contain higher concentrations of both acids can be applied for the treatment of the aluminum brazing sheet, the above concentrations are preferred for several reasons, including environmentally safe disposal of the used etchant.

The treatment of the brazing sheet surface can be accomplished by using an etchant which is kept within the temperature range from about 15° C. (59° F.) to about 98° C. (208° F.), preferably an aqueous solution maintained within the temperature range from about 65° C. (149° F.) to about 96° C. (205° F.).

The treatment time is kept at least 5 seconds, preferably within the range of at least about 10 seconds to about 60 seconds depending on the temperature and concentration of the etchant. It is to be understood that higher etchant concentrations and/or elevated treatment temperatures allow shorter treatment times. Selection of the temperature of the treatment, the treatment time and/or the concentration of the constituents of the etchant can be readily varied within the ranges provided and remain within the discretion of the user of the process.

Subsequent to the treatment of the brazing sheet with the aqueous acid solution of the invention the treated sheet is preferably rinsed with water and then dried. Due to the use of relatively low acid concentrations rinsing may not always be required and the treated sheet, after drying, may be directly subjected to brazing.

It has been found that when an aluminum sheet, which has been treated according to the invention, is subjected to brazing by any conventional aluminum brazing method, the fillet forming ability of the sheet is significantly increased as is readily measured by the increase of filler metal content in the brazed joint. Increased filler metal content in the brazed joint provides increased strength and greater fillet continuity for the joint while the absence of solid flux improves the corrosion resistance. Thus, it can be observed that the present process provides dual benefits over the prior art processes employed for the removal of oxide surfaces from aluminum sheet to be brazed.

The following examples will further illustrate the efficacy of the present invention.

EXAMPLE I

In this example a compact aluminum alloy radiator assembly to be joined by brazing and consisting of two preformed header pieces, four preformed lengths of 10 cm (about 4 inch) tubing and preformed fins, was subjected to the surface treatment according to the invention. The parts of the radiator assembly were made from 3000 series aluminum alloy while the header and tubes were clad with 4000 series alloy. The clad tubes were vapor degreased and then etched for 15 seconds in a treating solution warmed to about 95° C. (about 205° F.) and containing 0.5% by vol. of 50% by weight HF and 5% by vol. of 70% by weight $HNO_3$, balance water. Subsequently the clad header pieces were vacuum brazed to the treated tubing employing conventional vacuum brazing technique. The brazed tube and header joints were then examined for appearance and the tube-fin joints tested for fillet-forming ability by measuring the weight gain in the brazed joints in comparison to brazed joints produced on an untreated radiator assembly made from the same but untreated materials. It was found that the brazed joints produced between the tubes and the headers treated according to the invention were smooth and exhibited no "stitching" while such stitching was observable in the joint produced between the untreated parts. The term "stitching" generally refers to undulations and unevenness of the brazed joints. Also, there was significantly more metal in the tube to fin joints of the treated parts than in the case of the untreated parts as determined by measuring the efficiency of the bonding of the fins to the tubes.

The efficiency of bonding was determined by mechanically stripping the fins as completely as possible from the tubes. Stripping removed all unbonded portions of the fins leaving behind only those areas of fin which were adhered to the tube surfaces by braze fillets. Since the number of fin convolutions in the joint is known as is the width of the individual fin convolution/tube contact length, by measuring the total length of the fin/braze metal joint actually produced on the tube surface, the percentage of fin bonding can be calculated. For the unit treated according to the invention the bonding was measured to be 85%, while the untreated unit had a bonding of only 65% indicating that the inventive etching treatment significantly increases bonding efficiency.

EXAMPLE II

Brazed joints were produced on etched and unetched vertically suspended pieces of a 4045 aluminum alloy brazing sheet having 3003 aluminum alloy cross members attached thereto. Etching was accomplished by using a treating solution containing 0.5% by wt. of 50% by wt. HF and 5% by wt. of 70% by wt. $HNO_3$, balance water. The treating solution was applied at about 93° C. (about 200° F.) for less than 20 seconds. The parts were then vacuum brazed using the same conventional vacuum brazing technique as in Example 1. It was found that the fillet size significantly increased in the case of the pretreated brazing sheet. Several measurements were made to measure the increase of the metal content in the fillet produced between the etched brazing sheet and the cross member and also between the fillets produced by using untreated brazing sheet. Each individual measurement was made by weighing and determining the filler metal which collected, after brazing, in the bottom portion of the sheet below the joint. From the dimensions of the brazing sheet sample and a measurement of the cladding thickness the total weight of brazing metal available was calculated for both the treated and untreated brazing sheet. The amount of brazing metal retained in the joint was obtained by subtracting from the total weight the weight collecting at the bottom and expressing it as a percentage of the total. The calculated results are shown in the Table below.

TABLE

| Available Braze Cladding in Fillets (in %) | |
| --- | --- |
| Untreated Sheet | Treated Sheet |
| 44.0 | 66.0 |
| 43.0 | 63.0 |
| 42.0 | 73.0 |
| 42.0 | 62.0 |
| 45.0 | 75.0 |
| Average: 43.2 | 67.8 |

It can be readily observed that the available braze cladding in the fillets of the treated sheet is significantly higher than in the case of the untreated sheet and such increase in joint size considerably increases the strength of the fillet.

What we claim is:

1. A method for improving the fillet-forming ability of brazeable aluminum alloy materials by treating the material, prior to brazing, with an aqueous solution containing from 0.05 to 5% by wt. HF and from 1 to about 20% by wt. $HNO_3$ whereby the aqueous solution is heated to a temperature in the range from 15° C. to 98° C. for a time period not less than 5 seconds and recovering the treated material.

2. A method according to claim 1 wherein the concentration of the HF component of the solution is within the range from 0.10 to 0.65% by wt., and the concentration of the $HNO_3$ component is within the range from 2 to 6% by wt.

3. A method according to claim 1 wherein the temperature of the solution is kept within the range from 65° to 96° C.

4. A method according to claim 1 wherein the length of the treatment is within the range from 10 seconds to 60 seconds.

5. A method according to claim 1 wherein the treated material is aluminum alloy vacuum brazing sheet.

6. A method according to claim 1 wherein the treated material is a component of an aluminum alloy heat exchanger.

7. A method according to claim 6, wherein the aluminum alloy heat exchanger is a radiator.

8. A method according to claim 6 wherein the aluminum alloy heat exchanger component is selected from fins, headers and tubes.

9. A method according to claim 1 wherein the material is made from an Aluminum Association aluminum alloy of the 1000, 3000, 4000, 5000 or 6000 series.

10. A method according t claim 9 wherein the alloy is clad with an Aluminum Association 4000 series aluminum alloy.

* * * * *